W. E. JACOBS.
SYRUP STRAINER.

No. 65,751. Patented June 11, 1867.

Witnesses:
R. T. Campbell
Edw Schafer

Inventor:
William E Jacobs
Mason, Fenwick & Lawrence
attorneys

United States Patent Office.

WILLIAM E. JACOBS, OF COLUMBUS, OHIO.

Letters Patent No. 65,751, dated June 11, 1867.

IMPROVED SIRUP-STRAINER.

The Schedule referred to in these Letters Patent and making part of the same.

TO ALL WHOM IT MAY CONCERN:

Be it known that I, WILLIAM E. JACOBS, of Columbus, Franklin county, State of Ohio, have invented a new and improved Sirup-Strainer; and I hereby declare the following to be a full, clear, and exact description thereof, reference being had to the accompanying drawings, in which—

Similar letters of reference indicate corresponding parts in both figures.

This invention is designed to facilitate the separation of feculencies from sugar juice as it flows from the mill, by causing the juice to flow upward through a suitable strainer, and thus accumulating the sediment beneath the latter instead of upon its surface, as will be hereinafter described.

To enable others skilled in the art to understand my invention, I will describe its construction and operation.

Figure 1:
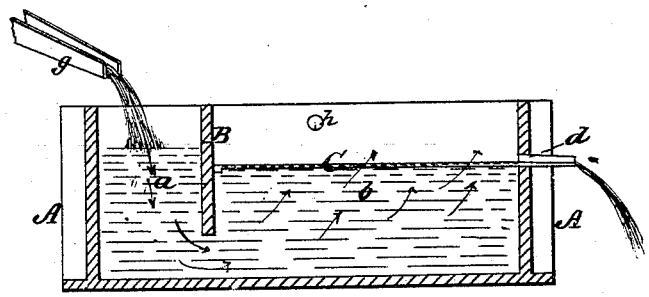
Figure 1 is a vertical section, taken longitudinally through the improved strainer.
Figure 2:
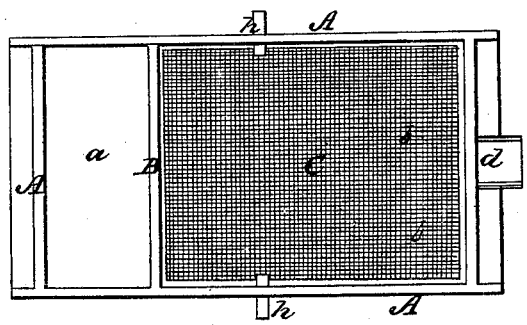
Figure 2 is a top view of the strainer.

In the accompanying drawings, A represents a vessel, which may be made of any suitable capacity and of any convenient shape. B represents a transverse partition, which extends from the top of the vessel A nearly to its bottom, and which divides this vessel into two apartments, $a$ and $b$. C represents a horizontal strainer, which is secured within the largest apartment $b$, at a point below the top of said vessel, and on a level with the bottom of a discharge opening, $d$, as shown in fig. 1. The strainer may be made of wire gauze, or of any other suitable substance, and the vessel A may be made of metal or other suitable substance. The juice flows from the mill or from a reservoir through a trough, $g$, into the smallest apartment $a$, and passes beneath the partition B, by which latter most of the floating impurities will be arrested and precipitated. The juice rises in the apartment $b$, and flows upward through the screen or strainer C, and then passes off through the outlet $d$ above this strainer, as indicated by the arrows in fig. 1. Should the liquid flow too rapidly into the smallest apartment $a$, that is to say, faster than it could flow from the apartment $b$, it would be liable to press some of the impurities in this latter apartment against the lower surface of the strainer C, and thus retard the flow through the strainer. To obviate this the vessel A may be suspended by means of trunnions $h\ h$; so that in case the liquid in the apartment $a$ rises too high above the surface of the liquid in the apartment $b$, this latter side of the vessel will suit until the surface of the liquid in both apartments is level, or nearly so.

It will be seen from the above description that the sediment will be collected in the vessel A, beneath the strainer C, from which vessel it can be readily removed, and that the strainer will not be liable to become clogged, for the reason that the sediment cannot collect upon it, as in strainers which are so arranged that the liquid must pass down through them by its own gravity, and leave all the sediment upon them.

Having described my invention, what I claim as new, and desire to secure by Letters Patent, is—

A straining apparatus which consists of a box, A, having a division, B, and strainer C applied within it, in such manner that the liquid to be strained shall pass upward through the strainer, substantially as described.

W. E. JACOBS.

Witnesses:
F. A. JACOBS,
H. L. JACOBS.